United States Patent
MacDonald

(10) Patent No.: US 7,954,274 B2
(45) Date of Patent: Jun. 7, 2011

(54) LIVE-BAIT-SIMULATING RESILIENT PUPPET FISHING LURE

(76) Inventor: Joel Vincent MacDonald, St. George, UT (US)

( * ) Notice: Subject to any disclaimer, the term of this patent is extended or adjusted under 35 U.S.C. 154(b) by 0 days.

(21) Appl. No.: 12/607,965

(22) Filed: Oct. 28, 2009

(65) Prior Publication Data

US 2010/0101137 A1    Apr. 29, 2010

Related U.S. Application Data

(60) Provisional application No. 61/109,044, filed on Oct. 28, 2008.

(51) Int. Cl.
*A01K 85/00* (2006.01)

(52) U.S. Cl. ................. 43/42.36; 43/42.02; 43/42.24

(58) Field of Classification Search ............... 43/42.36, 43/42.02, 42.03, 42.05, 42.08, 42.24
See application file for complete search history.

(56) References Cited

U.S. PATENT DOCUMENTS

| | | | | |
|---|---|---|---|---|
| 1,777,004 A * | 9/1930 | Lemere et al. | | 43/42.36 |
| 1,832,037 A * | 11/1931 | Meehan | | 43/42.36 |
| 2,290,433 A * | 7/1942 | Jeffers | | 43/42.02 |
| 2,595,191 A * | 4/1952 | Erickson | | 43/42.36 |
| 2,663,964 A * | 12/1953 | Martin | | 43/42.02 |
| 2,690,026 A * | 9/1954 | King | | 43/42.02 |
| 2,724,205 A * | 11/1955 | Howard | | 43/42.02 |
| 2,770,063 A * | 11/1956 | Martin | | 43/42.02 |
| 2,791,859 A * | 5/1957 | Wentworth | | 43/42.02 |
| 2,892,281 A * | 6/1959 | Schilling et al. | | 43/42.36 |
| 2,910,799 A * | 11/1959 | Wentworth | | 43/42.02 |
| 2,912,784 A * | 11/1959 | Carlin | | 43/42.24 |
| 3,205,608 A * | 9/1965 | Dickinson | | 43/42.05 |
| 3,376,663 A * | 4/1968 | Amrine | | 43/42.02 |
| 3,426,467 A * | 2/1969 | Bryant | | 43/42.36 |
| 3,543,430 A * | 12/1970 | Brokaw | | 43/42.05 |
| 3,899,847 A * | 8/1975 | Dworski | | 43/42.36 |
| 4,208,822 A * | 6/1980 | Bryant | | 43/42.02 |
| 5,025,586 A * | 6/1991 | Pixton | | 43/42.36 |
| 5,121,567 A * | 6/1992 | Boone | | 43/42.24 |
| 5,142,811 A * | 9/1992 | Freeman | | 43/42.36 |
| 5,640,798 A * | 6/1997 | Garst | | 43/42.24 |
| 5,829,183 A * | 11/1998 | Guerin | | 43/42.02 |
| 6,061,949 A * | 5/2000 | Fairchild | | 43/42.24 |
| 6,393,755 B1 * | 5/2002 | Weaver | | 43/42.03 |
| 6,408,566 B1 * | 6/2002 | Ward, Sr. | | 43/42.24 |
| 6,446,381 B1 * | 9/2002 | Firmin | | 43/42.24 |
| 6,546,663 B1 * | 4/2003 | Signitzer et al. | | 43/42.02 |
| 6,763,631 B1 * | 7/2004 | Santini | | 43/42.36 |
| 6,865,842 B2 * | 3/2005 | Brinkman | | 43/42.36 |
| 7,059,080 B2 * | 6/2006 | Bendel | | 43/42.36 |
| 2002/0095854 A1 * | 7/2002 | Kinnear | | 43/42.03 |
| 2005/0217166 A1 * | 10/2005 | MacDonald | | 43/42.36 |

(Continued)

*Primary Examiner* — Darren W Ark
(74) *Attorney, Agent, or Firm* — Angus C. Fox, III

(57) ABSTRACT

A resilient fishing lure, which simulates the movement of live bait when a fisherman tugs on the fishing line, includes a molded, resilient worm/amphibian larvae-like body. The body is unitary, having a head equipped with a longitudinal aperture, an attached tail equipped with at least two apertures, and at least one hook secured to the body. A fishing line is routed, first through the longitudinal aperture in the head, then in an "S" pattern through the remaining apertures, and secured to the body through the aperture farthest from the head. Resiliently-hinged jaw flaps on an anterior portion of the head open to positions of maximum hydrodynamic drag when the lure is pulled forward through the water, thereby transferring a portion of the pulling force to the tail so that is transformed from an elongate configuration to a serpentine configuration.

18 Claims, 3 Drawing Sheets

U.S. PATENT DOCUMENTS

| | | | |
|---|---|---|---|
| 2006/0053679 A1* | 3/2006 | Milanese | 43/42.36 |
| 2007/0199232 A1* | 8/2007 | Littlejohn | 43/42.24 |
| 2010/0050497 A1* | 3/2010 | Brown | 43/42.36 |
| 2010/0154285 A1* | 6/2010 | Greenfield | 43/42.36 |

* cited by examiner

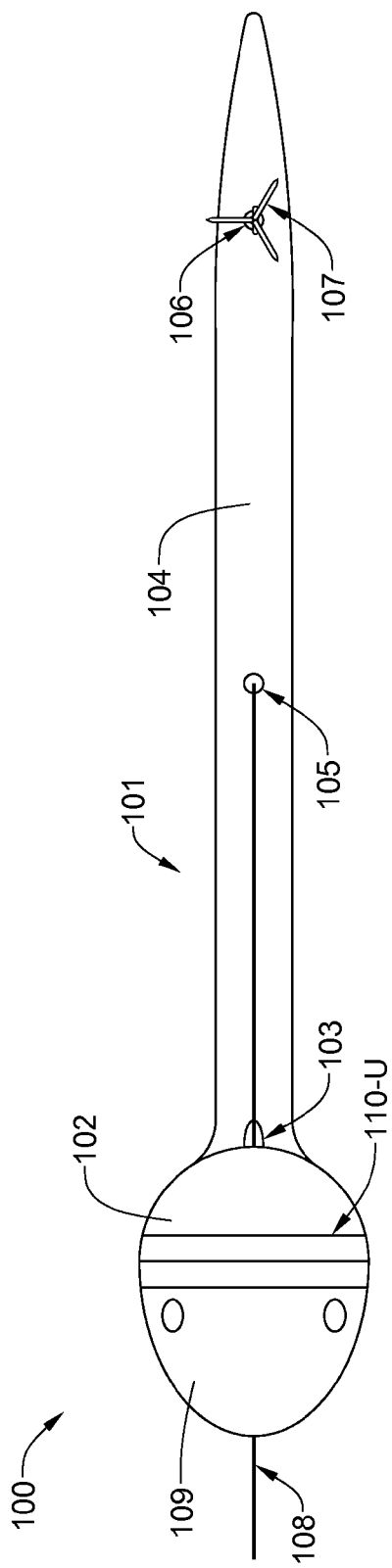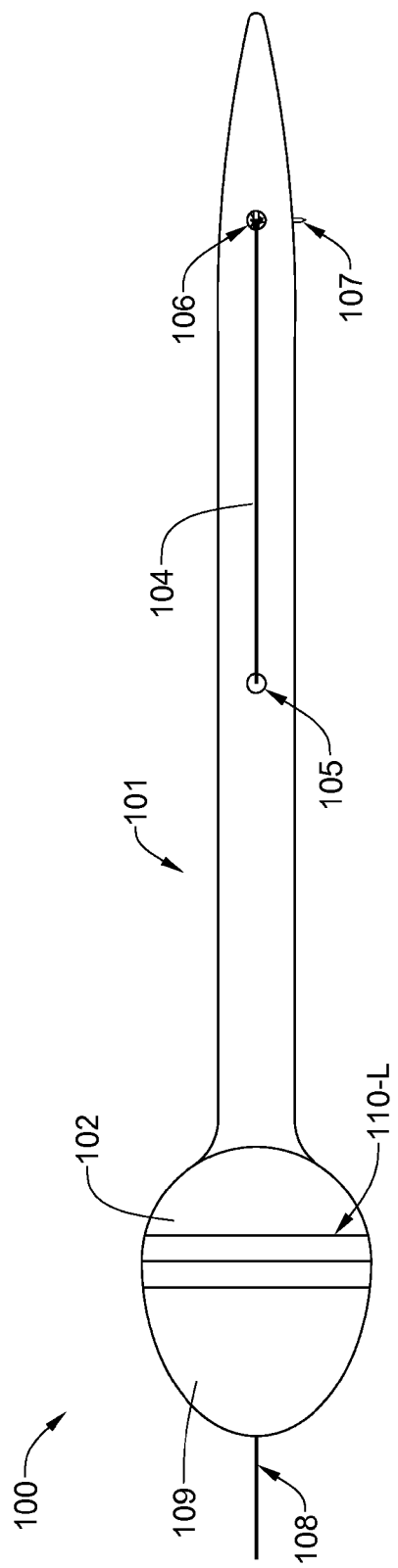

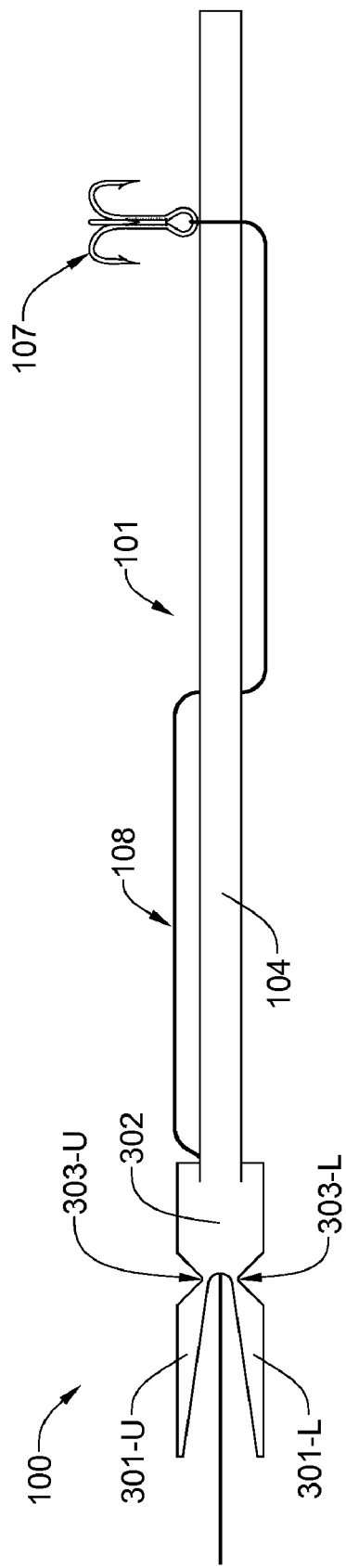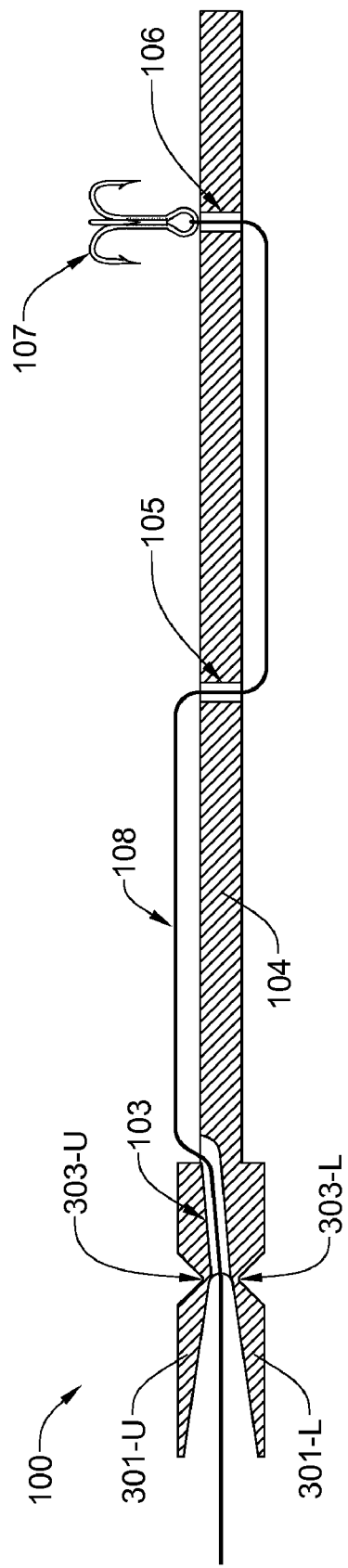

LIVE-BAIT-SIMULATING RESILIENT PUPPET FISHING LURE

This application has a priority date based on Provisional Patent Application No. 61/109,044, which has a filing date of Oct. 28, 2008, and is titled LIVE-BAIT-SIMULATING RESILIENT PUPPET FISHING LURE.

BACKGROUND OF THE INVENTION

1. Field of the Invention

This invention relates to fishing lures and, more particularly, to fishing lures which can be made to move to simulate the movements of live bait.

2. Description of the Prior Art

Probably no class of patents is more symptomatic of the American obsession with leisure activities than that of fishing lures. For many decades, inventors have attempted to imbue lifeless lures with characteristics of live bait.

U.S. Pat. No. 2,910,799 to Wentworth discloses an articulated fishing lure having a body with a fore portion and an aft portion interconnected by a leaf spring. A fishing line passing through an aperture in the fore portion is tied to an eye screw on the aft portion. A concave plate rigidly attached to the fore portion provides water resistance so that the leaf spring temporarily bends when the lure is pulled through the water.

U.S. Pat. No. 2,912,784 to Carlin discloses an artificial fishing lure having a resilient elongated cylindrical body which simulates an earth worm, a pair of spaced-apart screw eyes rigidly anchored in the body, a draw cord passing through the screw eyes and secured to a rear portion of the body, a plurality of hooks secured to the draw cord, and a spinner of fan-like contour, as well as a plurality of perforated beads loosely strung on the draw cord in front of the foremost eye screw. By tugging on the draw cord, a combination of inertia and resistance provided by the spinner cause the body to momentarily transform itself from the elongated configuration to a curved configuration. At lease fourteen individual components are assembled to form the Carlin lure.

U.S. Pat. No. 3,376,663 to Amrine discloses a fishing lure having a main body portion and appendages formed integrally from resiliently flexible material and having a covered spring steel wire frame embedded therein. A guide tube extends longitudinally through the main body and a line extends through the guide and is connected at one end to the frame at points on the appendages spaced from the main body for remotely controlling the flexing of the appendages. A pull or sharp tug on the line will result in flexing of the leg appendages as the inertia of the lure and its resistance to movement through the water oppose the force produced by a pull on the line.

U.S. Pat. No. 3,543,430 to Brokaw discloses a fishing lure having an elongated body made of resilient material having at least one recess aperture therein and a connecting line operably associated with the body for momentarily selectively flexing the body along its length. At least one hook is operably connected to the connecting line. The lure relies primarily on inertia U.S. Pat. No. 4,208,822 to Bryant discloses a lure designed to simulate the movements and sounds of a squid as it advances through the water. The Bryant lure includes a massive head and at least one collapsible intermediate body portion connected to an elongate wire. During use, pulling on the fishing line causes the tail end of the lure to move toward the head and collapse the intermediate body portion before the head moves forward through the water. The collapsing intermediate body portion also generates an audible sound which is much like the sound made by a squid.

U.S. Pat. No. 5,829,183 to Guerin discloses an artificial bait which simulates a wounded or dying natural prey of game fish. The bait includes an upper lure body section having a weighted bill, an interior channel for receiving a fishing line and a vertical channel for retaining a hook support wire, a lower tail section having a tail actuator mechanism, and a hinge mechanism. The tail actuator mechanism includes an actuator wire having a tying eye at each end and a counterweight in the proximity of one end. Operation of the invention causes the bill to dip and rise in the water as the tail moves between a horizontal and vertical position, and the lure stays suspended without moving forward. Cranking the bait forward causes the body of the lure to wobble through the water, similar to an injured fish, unable to right itself.

All of the patents heretofore referenced disclose fishing lures that are large, relatively expensive and complex structures. What is needed is a compact, inexpensive fishing lures that simulate the movements of live bait

SUMMARY OF THE INVENTION

A resilient fishing lure simulates the movement of live bait when a fisherman tugs on the fishing line. It includes a resilient body molded to appear like a cross between a worm and an amphibian larvae. The body is unitary, having a head equipped with a longitudinal aperture that curves or otherwise transitions to an exterior surface of the body, an attached tail equipped with at least two apertures with axes that are preferably within a common plane and generally perpendicular to the longitudinal axis of the tail portion, and at least one hook secured to the body. A fishing line is routed, first through the longitudinal aperture in the head, then in an "S" or square-wave pattern through the remaining apertures, and secured to the body through the aperture farthest from the head. The apertures are of significantly larger diameter than the fishing line so as to minimize sliding friction. An anterior portion of the head is equipped with a water brake that automatically deploys as the lure is pulled forward through water with the fishing line. The water brake includes a pair of resiliently-hinged upper and lower jaw flaps, which are partially open, and which open further in opposite directions to positions of maximum drag when the lure is pulled forward through the water, thereby transferring a portion of the pulling force to the tail so that is transformed from an elongate configuration to a serpentine configuration. When the tugging stops, the force on the tail is released and it returns to its elongate configuration. Likewise, the jaw flaps return to their semi-open configuration. The resilient body is injection molded from rubber or a similar elastomeric compound. Because of its simplicity, the resilient fishing lure is dramatically less expensive to manufacture than are other conformation changing lures of the prior art. In fact, the lure of the present invention can be manufactured at such low cost that it is truly an expendable item.

BRIEF DESCRIPTION OF THE DRAWINGS

FIG. 1 is a top plan view of a fishing lure which has an appearance that is a cross between a worm and an amphibian larvae;

FIG. 2 is a bottom plan view of the fishing lure of FIG. 1;

FIG. 3 is a left-side elevational view of the fishing lure of FIG. 1;

FIG. 4 is a cross sectional view of the fishing lure of FIG. 1 that has been split longitudinally by a vertical plane, with the right half of the lure being shown.

DETAILED DESCRIPTION OF THE INVENTION

Figure 5:
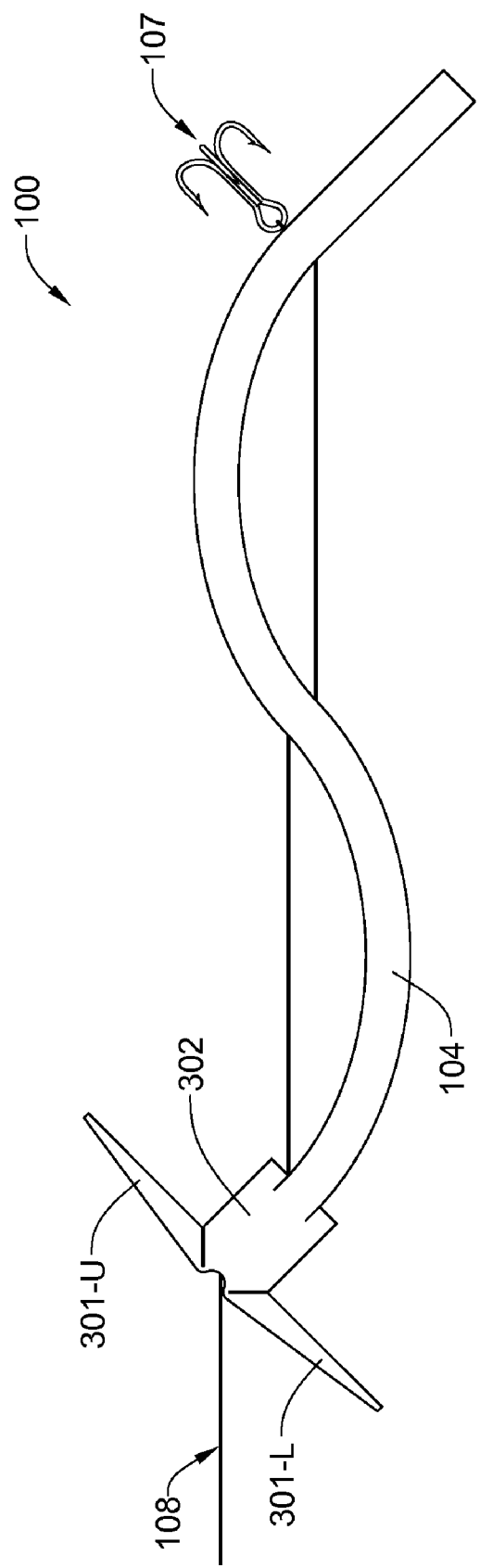
FIG. 5 is a left-side elevational view of the fishing lure of FIG. 1 as it is being pulled through the water by the fishing line in a generally forward direction.

The present invention provides a fishing lure having a resilient body, which simulates the movement of live bait when a fisherman tugs on the fishing line. The lure will now be described in detail with reference to the attached drawing figures. It should be understood that the drawings are not necessarily drawn to scale, but are intended to be merely illustrative of the invention.

Referring now to FIGS. 1 through 4, the new fishing lure 100 has a resilient body 101 molded in the shape that is a cross between a worm and an amphibian larvae. The body may be molded from one of many available elastomeric compounds. An elastomeric compound is a polymeric rubber-like material that at room temperature returns rapidly to approximately to its initial dimensions and shape after being substantially deformed by a weak stress, when the stress is released. Both natural and synthetic rubber compounds are suitable eslastomeric materials. Such materials specifically include RTV and HTV silicone rubber, vulcanized ethylene propylene copolymer, chlorinated polyethylene, chlorosulfonated polyethylene, polybutadiene rubber, polyolefin elastomers, polyurethane elastomers, butadiene styrene copolymer rubbers, polychloroprene (neoprene) rubber, hydrocarbon rubbers, polyisobutylene, butyl rubber (a copolymer of isobutylene and isoprene) and polyisoprene (natural) rubbers. It should be understood that excessive vulcanization of natural rubber will produce hard rubber, which is rather brittle and, thus, unsuitable for the present invention. Polyesters which are formulated for flexibility may be suitable thermosetting plastics. Polyethylenes, vinyls, polypropylenes, polyamides, polycarbonates, and polyurethanes may be suitable thermoplastic compounds. The body 101 is unitary, having a head 102 equipped with a longitudinal aperture 103, an attached tail 104 equipped with at least two apertures 105 and 106, respectively, with axes that are preferably within a common plane and generally perpendicular to the longitudinal axis of the tail portion, and at least one hook 107 secured to the body 101. A fishing line 108 is routed, first, through the longitudinal aperture 103 in the head 102, then in an "S" or square-wave pattern through the remaining apertures 106 and 107, and secured to the body 101 through aperture 107, which is farthest from the head 102. The apertures 103, 106 and 107 each have diameters which are significantly larger diameter than the fishing line 108, so as to minimize sliding friction of the fishing line 108 within the apertures 103, 106 and 107. It should be obvious that aperture 106 may be replaced with a line securing device, such as a loop molded in the body or an eyelet embedded within the body, as the fishing line 108 need not slide through aperture 106. The fishing line 108 and hook 107 could be secured to the line securing device. For the embodiment of the invention depicted in the drawing figures, aperture 106 functions as the line securing device. An anterior portion 109 of the head 102 is equipped with a pair of resiliently-hinged upper and lower jaw flaps 301-U and 301-L, which are partially open, and which open further in opposite directions to positions of maximum drag when the lure is pulled forward through the water. The upper jaw flap 301-U is joined to a posterior portion 302 of the head 102 by an upper live hinge 303-U. The lower jaw flap 301-L is joined to the posterior portion 302 of the head 102 by a lower live hinge 303-L. The upper live hinge 303-U is positioned at the bottom of an upper transverse groove 110-U, the opposing walls of which are brought together as the upper jaw flap 301-U elevates as the body 101 is pulled through the water. Likewise, the lower live hinge 303-L is positioned at the top of a lower transverse groove 110-L, the opposing walls of which are brought together as the lower jaw flap 302-L drops as the body 101 is pulled through the water. As the walls of each transverse groove 110-U and 110-L are brought together as the body 101 is pulled through the water, the jaw flaps 301-U and 301-L reach limits of maximum deflection, which are associated with maximum levels of hydrodynamic drag as the body 101 is pulled through the water. The jaw flaps 301-U and 301-L function like a water brake that is reminiscent of the deflecting flap air brakes used on racing cars and aircraft.

Referring now to FIG. 5, the lure 100 is being pulled through the water. The upper and lower jaw flaps 301-U and 301-L have both reached limits of maximum deflection, thereby creating increased levels of hydrodynamic drag. As a result of the increased levels of drag, a portion of the pulling force on the fishing line 108 is transferred to the tail 104 so that it is transformed from an elongate configuration to a serpentine configuration. This serpentine configuration of the tail 104 is seen in FIG. 5. When tugging on the fishing line 108 ceases, the force on the tail 104 is released and it returns to the elongate configuration seen in FIGS. 1 through 4.

Although only a single embodiment of the invention has been disclosed herein, it will be obvious to those having ordinary skill in the art that changes and modifications may be made thereto without departing from the spirit and scope of the invention as hereinafter claimed.

What is claimed is:

1. A fishing lure comprising:
an elongate resilient body having anterior and posterior ends, said anterior end being equipped with a water brake having a pair of opposed, normally-closed flaps which are resiliently mounted to the body with live hinges, said body having a longitudinal aperture with an entrance accessible at the anterior end that transitions to an exit on a surface of the body, said body also having a securing device positioned adjacent the posterior end, and at least one transverse aperture positioned between said securing device and said exit; and
a fishing line passing through said longitudinal aperture and said at least one transverse aperture in a square wave pattern and being secured to said securing device; and
at least one hook secured to said elongate body,
wherein the water brake deploys and the body assumes a serpentine configuration when the lure is pulled, anterior end first, through water with a portion of said fishing line that extends forward of said entrance.

2. The fishing lure of claim 1, wherein each of the live hinges is unitary with the flaps and the body.

3. The fishing lure of claim 1, wherein each of the flaps opens about 90 degrees in order to maximize hydrodynamic drag.

4. The fishing lure of claim 3, wherein an amount which the flaps open is limited by an exterior, right-angle groove between each flap and the body that is located above each live hinge.

5. The fishing lure of claim 1, wherein said securing device is a posterior transverse aperture.

6. The fishing lure of claim 5, wherein said fishing line passes through said posterior transverse aperture and is secured to said at least one hook.

7. A fishing lure comprising:
an elongate resilient body having anterior and posterior ends, said anterior end being equipped with a water brake having a pair of opposed, normally-closed, jaw-like flaps resiliently mounted to said body with live hinges, said body having a longitudinal aperture with an entrance accessible at the anterior end that transitions to an exit on a surface of the body, said body also having a securing device positioned adjacent the posterior end, and at least one transverse aperture positioned between said securing device and said exit; and
a fishing line passing through said longitudinal aperture and said at least one transverse aperture in a square wave pattern and being secured to said securing device; and
at least one hook secured to said elongate body;
wherein the jaw-like flaps open to a configuration of maximum hydrodynamic drag and the body assumes a serpentine configuration when the lure is pulled, anterior end first, through water with a portion of said fishing line that extends forward of said entrance.

8. The fishing lure of claim 7, wherein each of the live hinges is unitary with the flaps and the body.

9. The fishing lure of claim 7, wherein each of the flaps opens about 90 degrees in order to maximize hydrodynamic drag.

10. The fishing lure of claim 9, wherein an amount which the flaps open is limited by an exterior, right-angle groove between each flap and the body that is located above each live hinge.

11. The fishing lure of claim 7, wherein said securing device is a posterior transverse aperture.

12. The fishing lure of claim 11, wherein said fishing line passes through said posterior transverse aperture and is secured to said at least one hook.

13. A fishing lure comprising:
an elongate resilient body having anterior and posterior ends, said anterior end being equipped with a pair of opposed, normally-closed jaw flaps, each of which is resiliently coupled to a major portion of the resilient body with a live hinge, each live hinge being parallel to and spaced apart from the other live hinge, said jaw flaps being urged by water pressure to a full-open, maximum hydrodynamic drag configuration when said resilient body is propelled through a body of water, anterior end first, said resilient body being provided with a longitudinal aperture in the anterior end which passes between said live hinges and exits on a surface of said body immediately behind said anterior end, said body being also equipped with at least one transverse aperture which is spaced from said longitudinal aperture, said body being further equipped with a securing device adjacent said posterior end;
a fishing line passing through said longitudinal aperture and said at least one transverse aperture in a square wave pattern and being secured to said securing device; and
at least one hook secured to said elongate body.

14. The fishing lure of claim 13, wherein said securing device is a posterior transverse aperture.

15. The fishing lure of claim 14, wherein said fishing line passes through said posterior transverse aperture and is secured to said at least one hook.

16. The fishing lure of claim 13, wherein said jaw flaps open, thereby increasing hydrodynamic drag, and the body assumes a serpentine configuration when the lure is pulled through water with a portion of said fishing line that extends forward of said longitudinal aperture.

17. The fishing lure of claim 13, wherein each of the flaps opens about 90 degrees in order to maximize hydrodynamic drag.

18. The fishing lure of claim 17, wherein an amount which the flaps open is limited by an exterior, right-angle groove between each flap and the body that is located above each live hinge.

\* \* \* \* \*